US 9,178,912 B2

(12) United States Patent
Sharma et al.

(10) Patent No.: US 9,178,912 B2
(45) Date of Patent: Nov. 3, 2015

(54) VIRTUAL DEVICE CONTEXT (VDC) INTEGRATION FOR NETWORK SERVICES

(71) Applicant: CISCO TECHNOLOGY, Inc., San Jose, CA (US)

(72) Inventors: Samar Sharma, San Jose, CA (US); Nitesh G. Soni, San Jose, CA (US); Ronak Desai, San Jose, CA (US); Chao Feng, San Jose, CA (US); Jon Wei, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 422 days.

(21) Appl. No.: 13/677,392

(22) Filed: Nov. 15, 2012

(65) Prior Publication Data
US 2014/0137109 A1 May 15, 2014

(51) Int. Cl.
*G06F 9/455* (2006.01)
*H04L 29/06* (2006.01)
*H04L 12/931* (2013.01)
*H04L 12/24* (2006.01)

(52) U.S. Cl.
CPC ........ *H04L 65/1013* (2013.01); *G06F 9/45533* (2013.01); *H04L 49/356* (2013.01); *H04L 49/70* (2013.01); *G06F 2009/45595* (2013.01); *H04L 41/0803* (2013.01)

(58) Field of Classification Search
None
See application file for complete search history.

(56) References Cited

U.S. PATENT DOCUMENTS

| | | | |
|---|---|---|---|
| 8,954,957 B2* | 2/2015 | Wu et al. | 718/1 |
| 2012/0278802 A1* | 11/2012 | Nilakantan et al. | 718/1 |
| 2012/0324442 A1* | 12/2012 | Barde | 718/1 |
| 2013/0064133 A1* | 3/2013 | Ritz et al. | 370/254 |
| 2013/0074066 A1* | 3/2013 | Sanzgiri et al. | 718/1 |

OTHER PUBLICATIONS

"Cisco Application Control Engine and Cisco Nexus 7000 Series Integration White Paper", Sep. 1, 2011, pp. 1-40.
"White Paper Technical Overview of Virtual Device Contexts", Jun. 1, 2012, pp. 1-18.
CISCO: "White Paper Cisco NX-OS Software: Business-Critical Cross-Platform Data Center OS", Internet Citation, Jan. 1, 2010, pp. 1-14.
Cisco: "Cisco Nexus 7000 Series Virtual Device Context Deployment Scenarios and Recommended Practices What You Will Learn Virtual Device Context Overview", Jan. 1, 2012, pp. 1-16.
International Serach Report for PCT/US2013/069281, Apr. 17, 2014.

* cited by examiner

*Primary Examiner* — Kenneth Tang
(74) *Attorney, Agent, or Firm* — Patterson & Sheridan, LLP (57) ABSTRACT

Methods and apparatus are provided for virtual device context (VDC) integration for network services. VDC integration for network services generally includes mapping a virtual switch, physical ports on the network switch assigned to the virtual switch, a service node and a physical port on a service node to share a common VDC associated with a configuration of the virtual switch. In this manner, the VDC concept is extended to the service node and the network may be easily managed, with a network switch and associated service nodes configured through a single processing system on the network switch or service node.

25 Claims, 8 Drawing Sheets

VIRTUAL DEVICE CONTEXT (VDC) INTEGRATION FOR NETWORK SERVICES

TECHNICAL FIELD

Embodiments presented herein relate to network communications and, more particularly, to extending a virtual device context (VDC) configuration to include a partition on a service node associated with a virtualized network switch and a link between the VDC and the service node.

BACKGROUND

A network enables data sharing among computing devices or hosts connected to that network. A network switch connects hosts to given network and can also connect one network segment to another. A network switch may inspect data packets as they are received. By inspecting a packet, a network switch may determine the source and destination of a packet and may forward the packet accordingly. In addition to routing and forwarding functions, a network switch may perform a variety of additional functions or tasks on the traffic forwarded by that switch. For example a network switch can provide a firewall or intrusion detection services on traffic processed by that switch.

Virtualization allows a computing device such as a network switch, service appliance, or computer server to do the job of multiple devices by sharing the resources of the single device across multiple virtualized environments rather than devoting the entire device to a single function. For example, a virtual machine (VM) provides a representation of a computing system, e.g., a virtualized processor, CPU or memory, allowing a host operating system and applications to execute on the virtualized hardware components. Running multiple VMs on a physical computing system typically increases the overall utilization system. A VM may run applications and may have a number of virtual ports—which may also be referred to as virtual interfaces—that are coupled to a virtual switch. That is, multiple VMs instantiated on a server may be connected to a virtualized network switch managed by the virtualization software. In turn, the virtualized network connections are connected to the physical ports on the computing system.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Embodiments presented in this disclosure generally relate to methods and apparatus for extending a virtual device context (VDC) on a network switch to include a link with partitioned resources (e.g., a VM or device context) on a service node in an effort to increase efficiency and facilitate configuration, management, data traffic processing and sharing of resources for network services.

One embodiment presented herein provides a system for hosting network services. The system generally includes a network switch and a service node. The network switch generally includes at least one virtual switch and a set of physical ports assigned to the virtual switch, wherein a virtual device context (VDC) is associated with a configuration of the virtual switch. The virtual switch, the physical ports assigned to the virtual switch, the service node, and a physical port on the service node generally share in common the VDC.

Another embodiment presented herein provides a method of configuring a system for hosting networking network services. The method generally includes providing a network switch having a virtual switch and set of physical ports and providing a service node that processes network traffic forwarded from the virtual switch, where in the service node has a physical port connecting the service node to one of the set of physical ports assigned to the virtual switch, and wherein the virtual switch, the set of physical ports, the service and the physical port of the service node share a common VDC associated with a configuration of the virtual switch.

Yet another embodiment presented herein provides a computer readable storage medium which, when executed on a computer system performs operations for configuring a system for hosting network services. The operations generally include configuring a network switch having a virtual switch and a set of physical ports. The operations generally also include configuring a service node that processes network traffic forwarded from the virtual switch, where in the service node has physical port connecting the service node to one of the set of physical ports assigned to the first virtual switch, and wherein the virtual switch, the set of physical ports, the service node, and the physical port of the service node share a common VDC associated with a configuration of the virtual switch.

EXAMPLE EMBODIMENTS

Embodiments of the present disclosure provide methods and apparatus for extending a virtual device context (VDC)

on a network switch (e.g., the Nexus® 7000 switch available from Cisco Systems, Inc. of San Jose, Calif.) to include resources provided by a service node (e.g., a service appliance or service line card). Extending the VDC configuration to a service node enables the network switch to manage both the configuration of the switch and the service node as well as manage network traffic in conjunction with the service node. For example, the service node could be a virtual machine (VM) hosting a firewall service that inspects all network frames forwarded to the network switch. That is, a VDC may include an associated service node configured jointly with a VDC on the switch. A management application on the network switch may manage and configure the assignment of resources on the network switch and the service node to VDCs, allocation of physical ports, and manage how data traffic is exchanged between the switch, the service node, and between VDCs. For example, the management application may create, configure, start, stop, restart, suspend, or delete VDCs configured across the VDC and the service node.

The network switch may be coupled to a service node via one or more physical ports on the network switch and physical ports on the service node. The service node may receive data frames from the ports and identify from which VDC the frame was received based on a mapping of the VDCs and the ports (port-VDC index). In addition to performing some service for frames received from the VDC, the service node may use the port-VDC index information to forward the frame to the appropriate VDC after processing a given frame. The service node may also use the information to allow or prevent data traffic between VDCs.

An Example Network

A single physical network switch may be configured to provide multiple virtualized network switches, where each virtual switch appears to any connected systems as a distinct physical device. That is, virtualization allows the switch to be logically segmented into multiple, distinct virtual switches (also referred to as device contexts or VDCs). The logical separation of a single physical network switch into multiple logical devices provides administration and management separation, change and failure domain isolation, as well as network segment isolation (e.g., address, VLAN, VRP and VPC isolation) for traffic on the virtual switches.

VDCs provide virtualized control and data planes within an independent management context. Each VDC functions as a separate logical entity within the switch, maintaining a distinct set of software processes, having a distinct configuration, which may be managed by a separate administrator. A single instance of the kernel and infrastructure layer supports all the VDCs on a physical network switch, however, each VDC runs its own Layer 2 and Layer 3 protocol services within the virtualized control plane of the VDC. These virtualized protocol services work exclusively on resources assigned to that VDC. A network manager controls which resources (e.g., VLANs, VRFs, PortChannels, Bridge Domains, SPAN, HSRP, GLBP Group IDs, and physical ports) are assigned to each VDC. Assigning a physical port to a VDC allows for virtualization of the hardware data plane. A VDC may have multiple physical ports assigned to it. Resources within a VDC may be associated with the physical ports or may by associated with virtualized ports within the VDC. The network manager is also responsible for creation and deletion of VDCs. Unlike physical switches which comprise a single virtual local area network (VLAN), each VDC on a physical network switch has a separate VLAN and virtual routing and forwarding (VRF). Each VDC, therefore, has a unique broadcast domain.

Service appliances and service line cards (service nodes), e.g., firewalls, load balancers and web security applications, also have a form of virtualization. Service nodes can be segregated into multiple VMs or device contexts which function as virtual service nodes, much like VDCs operate as independent virtual switches. Embodiments presented herein extend the VDC of a network switch to include resources of the service node.

Figure 1:
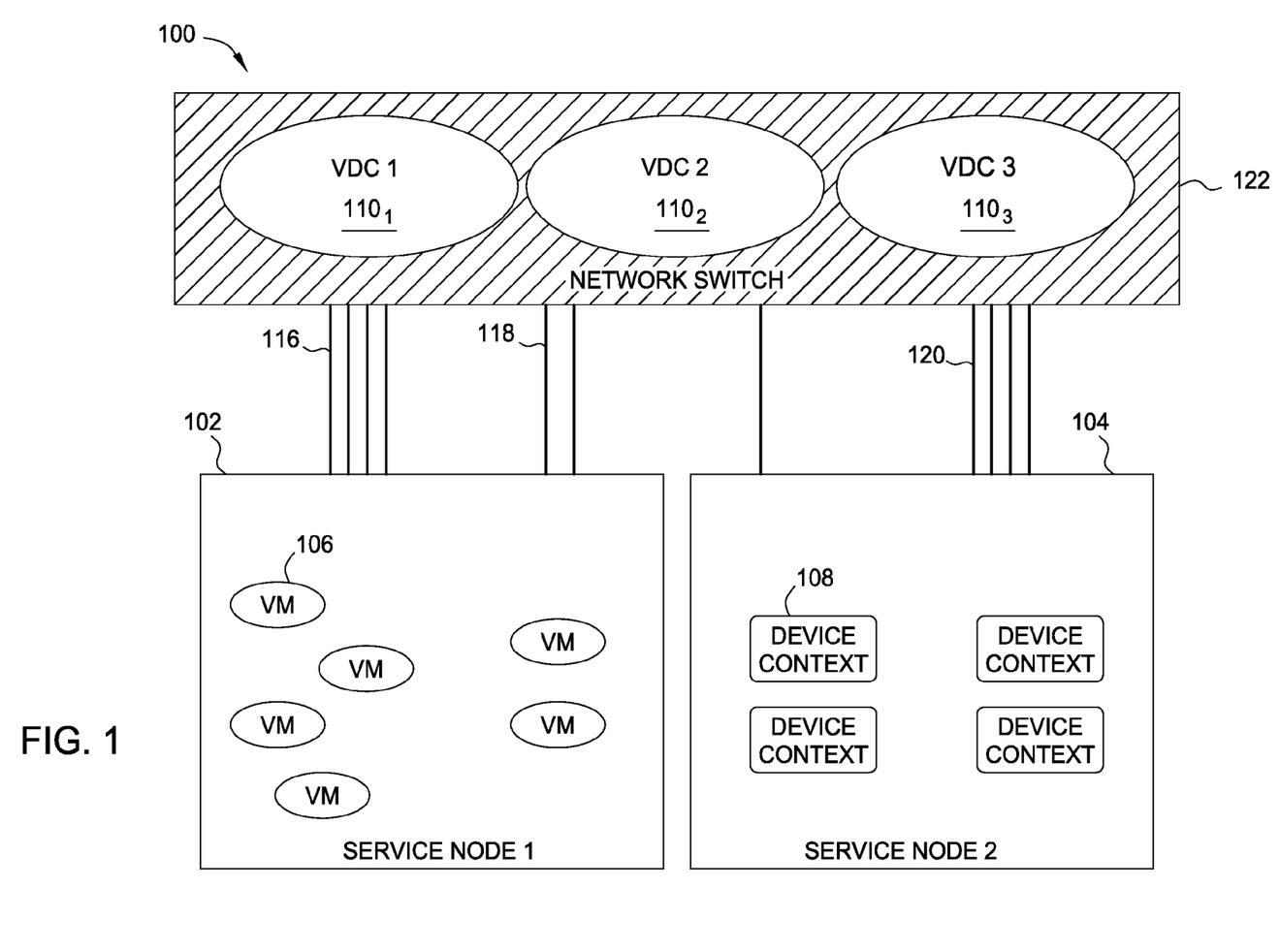
FIG. 1 illustrates an example network which includes a virtualized switch and segregated service nodes according to an example embodiment of the present disclosure.

FIG. 1 illustrates a network 100 configured to implement aspects of the present disclosure. As shown, the network 100 includes a network switch 122 coupled to one or more service nodes 102, 104. The network switch 122 provides a networking device connecting hosts to a common network segment as well as connecting multiple network switches. A network switch may process and route data frames within the network. In one embodiment, the network switch 122 is partitioned into one or more VDCs 110. Each VDC 110 on network switch 122 is a separate virtual switch, allowing the physical network switch 122 to function as multiple switches.

The network switch 122 is connected to service nodes 102, 104 via links 116, 118, 120, e.g., physical ports on each device connected via Ethernet CAT-5 cables. Examples of service nodes include service appliances and service line cards for performing a variety of network services, such as firewall functions, load balancing, and security (e.g., intrusion protection services). Resources on service nodes 102, 104 may also be segregated into partitions or virtual devices such as VMs 106 or device contexts 108. A VM generally refers to a software implementation of a computing system that executes programs like a physical computing system. For example, a load-balancer context (e.g., the ACE load-balancer available from Cisco) may be segregated into several VMs which function as multiple virtual load-balancers (V-ACEs).

Figure 2:
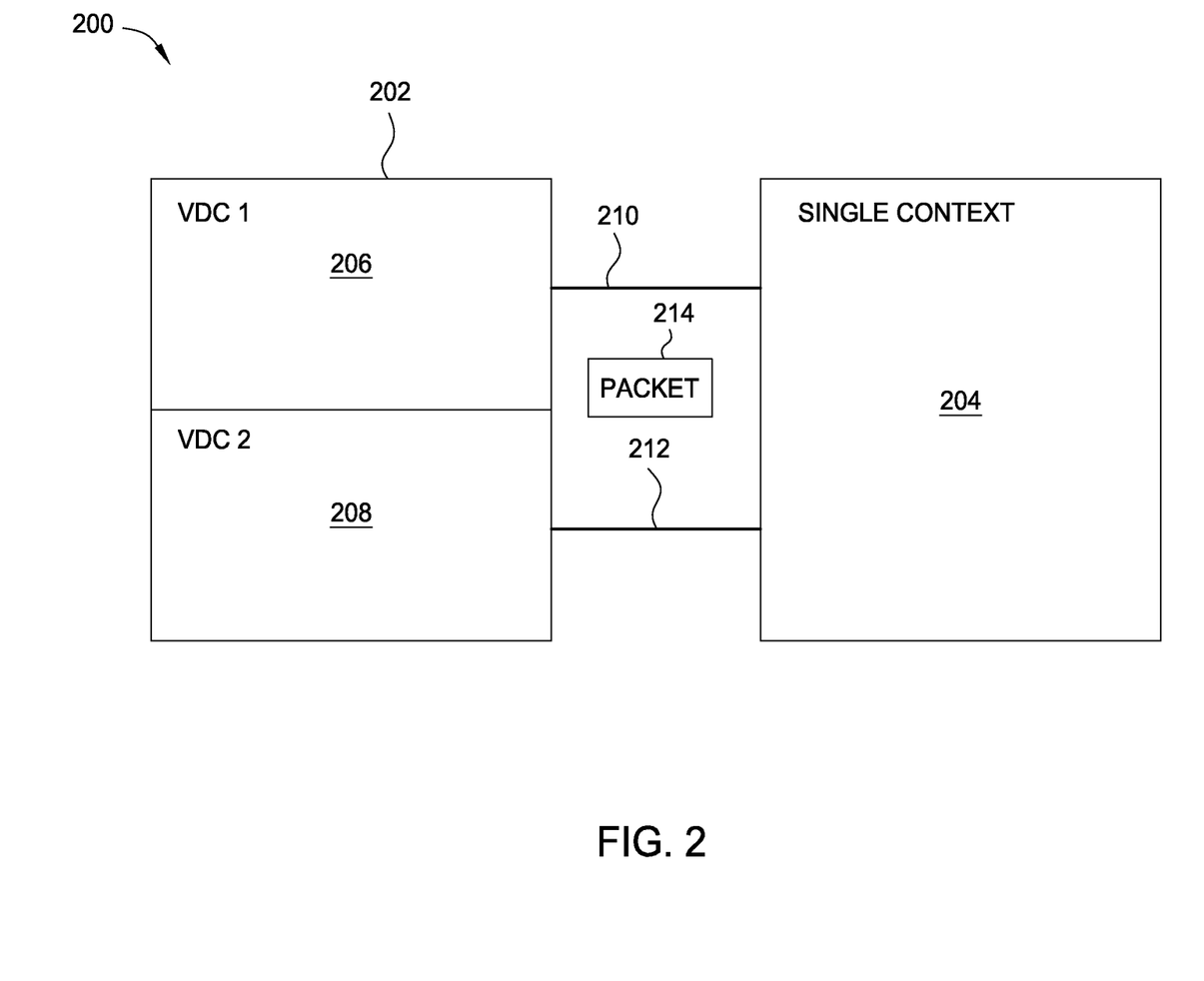
FIG. 2 illustrates an example network that includes a single context firewall service connected to VDCs on a network switch, according to an example embodiment of the present disclosure.

As shown in the network 200 illustrated in FIG. 2, a service node 204, such as a firewall with a single context, is connected to VDC1 206 and VDC2 208 of a network switch. Link 210 connects a first physical port on the firewall to a physical port on the network switch associated with VDC1 206. Link 212 connects a second physical port on the firewall to VDC2 208. From the view of service node 204, it is connected to two physical network switches. A frame 214 may be sent over the network 200 and firewall 204 may receive the frame 214 from either VDC1 206 via link 210 or VDC2 208 via link 212. Because the VDC configurations cover only the virtual switches (i.e., VDC1 206 and VDC2 208), Service node 204 is unaware that it is connected to VDCs, having separate broadcast domains, and will forward the packet 214 to either VDC1 206 or VDC2 208. Further, given that the firewall has a single device context, it typically cannot be configured to process frames received from VDC1 206 differently from how traffic is processed for VDC2 208. Further still, this also requires the firewall to be configured independently from the network switch. That is, separate configuration tools are used to configure and manage the firewall and the VDCs on the network switch.

An Example Network with Integrated VDC

Some service appliances and service line cards provide a form of segregation, but do not support VDC. As a result, users are required to configure a service independently from the configuration of a virtual switch (i.e., a VDC) on a physical network switch. Configuring multiple devices is often time consuming, involves multiple network devices, and entails complex networking operations and skills. Further, because the configurations are independent, service nodes are unable to identify whether network traffic is received from distinct physical switches or from multiple VDCs of the same physical switch. Additionally, service nodes are limited in that they generally have fewer physical ports than a network switch, therefore, service nodes are limited in their ability to be connected to VDCs on a network switch.

Accordingly, embodiments presented herein provide techniques for extending a configuration of a virtual switch on a network switch to partitioned resources (VMs) on a service node by including a virtual switch, resources on the service node, and physical ports on the network switch and the service node to a common VDC. Each virtual switch on the network switch may be associated with a different VDC in common with the service node. The service node and network switch (and corresponding virtual device context configuration on both) may then be managed by a management application of the network switch. For example, the management application may assign resources to a given VDC, enable and disable the VDCs, create, suspend or delete VDCs, and configure the service node to allow or deny cross-VDC traffic (as further described below). In this manner, the service node is configured to recognize and share a configuration with each virtual switch on the network switch.

Figure 3:
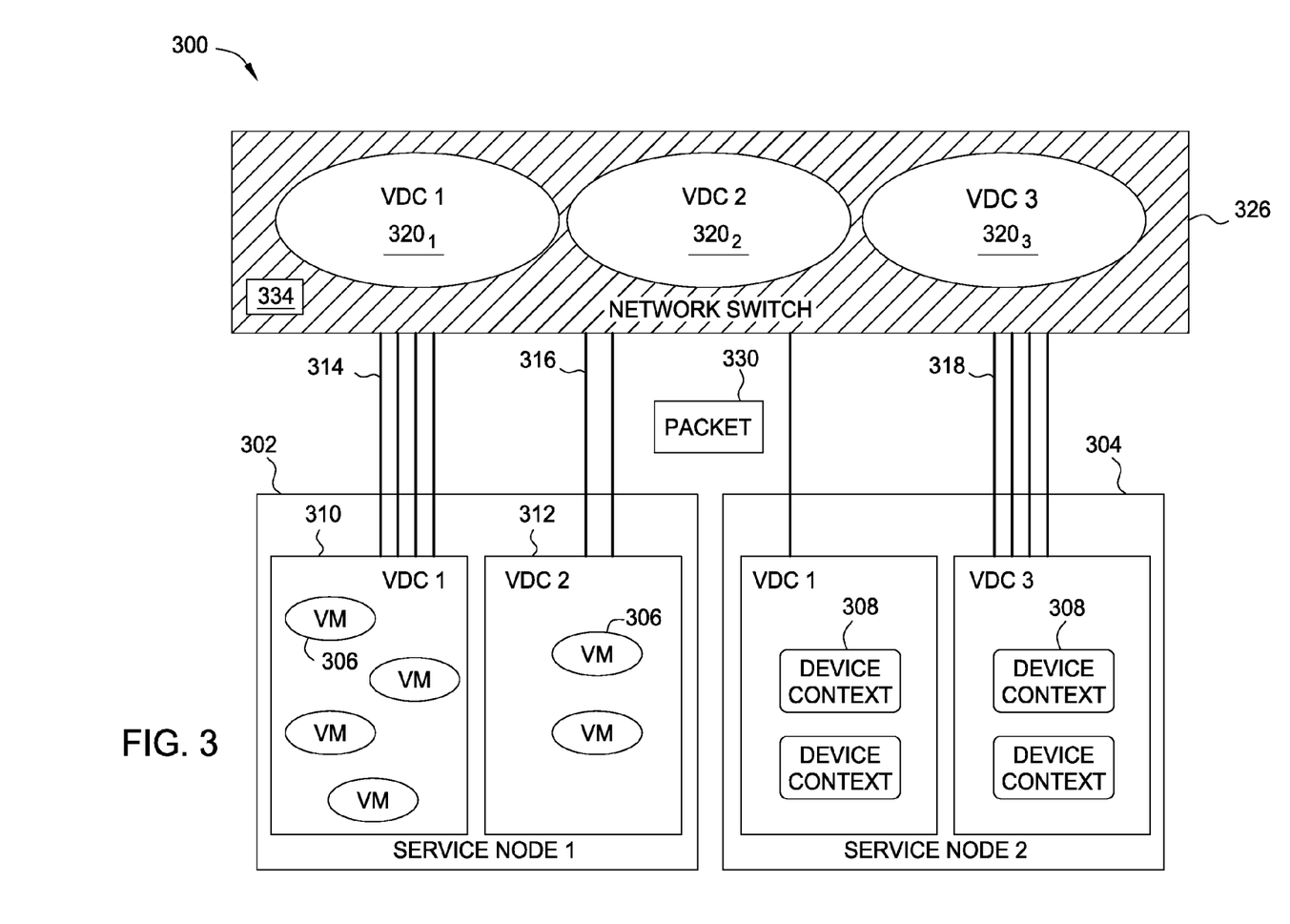
FIG. 3 illustrates the network of FIG. 1 where the VDCs on the network switch are mapped to VMs and device contexts on the service nodes, according to an example embodiment of the present disclosure.

FIG. 3 illustrates an example network 300 with an integrated VDC on a network switch 326 and extended to include a service node 302, according to one embodiment. As shown, the network 300 includes a network switch 326 coupled to service nodes 302, 304 (e.g., service appliances or service line cards). As noted, each service node 302, 304 may provide a variety of network management functions/services for traffic processed by the network switch 326. Further, network switch 326 has been segregated into VDCs 320. Each VDC 320 may have resources of the network switch 226 assigned to it, allowing each VDC to function and be configured as an independent physical switching device, while simultaneously running over the same physical system, i.e., while running on network switch 326. Similarly, each service node 302, 304 may host multiple virtual machines (VMs) or device contexts. For example, as shown in FIG. 3, VMs 306 or device contexts 308 such as firewall contexts, load-balancer contexts, or security contexts are partitioned to be associated with a VDC 320 of the network shared by a virtual switch of network switch 326 and a link 314, 316, 318. The service nodes 302, 304 may be connected with the network switch 326 via links 314, 316, 318. According to some embodiments, network resources of a similar type may be partitioned into VDCs dedicated to specific processes.

For some embodiments, the network switch 326 may also include a management application 334 used to manage and configure a VDC across both the network switch and the service nodes. Management application 334 may be a service node manager. The management application 334 may manage the assignment of resources on the network switch 326 and the service nodes 302, 304 into the VDCs to share a configuration. The management application 334 may allocate physical ports on the service nodes 302, 304 and physical ports on the network switch 326 to the VDCs 320 (links 314, 316, 318). The management application 334 may further manage the creation, suspension, and deletion of VDCs 320 and may inform the service nodes 302, 304 whenever a VDC is created, suspended, or deleted as well as the state and current configuration of existing VDCs. The network switch 326 and the service nodes 302, 304 may both be configured from the single management application 334 on the network switch 326. For example, if a network switch has two VDCs and the network switch is connected to two service nodes, the management application may turn on VDC1 and turn off VDC2 for service node 1, and the supervisor may turn off VDC1 and turn on VDC2 for service node 2.

For some embodiments a port-VDC index file maintains information specifying which physical ports are allocated to which VDCs. The port-VDC index allows the service nodes 302, 304 to identify the VDC from which a frame 330 is received based on the port from which that frame 330 is received. The service node may use this information to prevent mis-forwarding of the frame 330. Each VDC 320 may be assigned a policy for handling traffic. The service nodes 302, 304 may apply a traffic forwarding policy based on an identification of which VDC the service node receives the frame. Once the service node 302, 304 identifies which VDC sent the traffic, the service nodes 302, 304 may determine which partition 310, 312 of the service nodes 302, 304 will handle the traffic based on the mapping of the VDCs 330 on the network switch 326 to partitions 310, 312 of the service nodes 302, 304.

According to some embodiments, management application 334 of network switch 326 may be further configured to divide an access control list (ACL) among the VDCs 320. An ACL, with respect to a computer file system, is a list of permissions attached to an object. An ACL specifies which users or system processes are granted access to objects, as well as what operations are allowed on given objects. Each entry in a typical ACL specifies a subject and an operation. For instance, if a file has an ACL that contains (Alice, delete), this would give Alice permission to delete the file. Access Control List refers to rules that are applied to ports are available on a host or other layer 3, each with a list of hosts and/or networks permitted to use the service. Both individual servers as well as routers can have network ACLs. Access control lists can generally be configured to control both inbound and outbound traffic, and in this context they are similar to firewalls. The ACL tables on the network switch and on the service node may configured as part of the VDCs. By dividing the ACL across the VDCs, each VDC can be assigned its own set of permissions.

Figure 4:
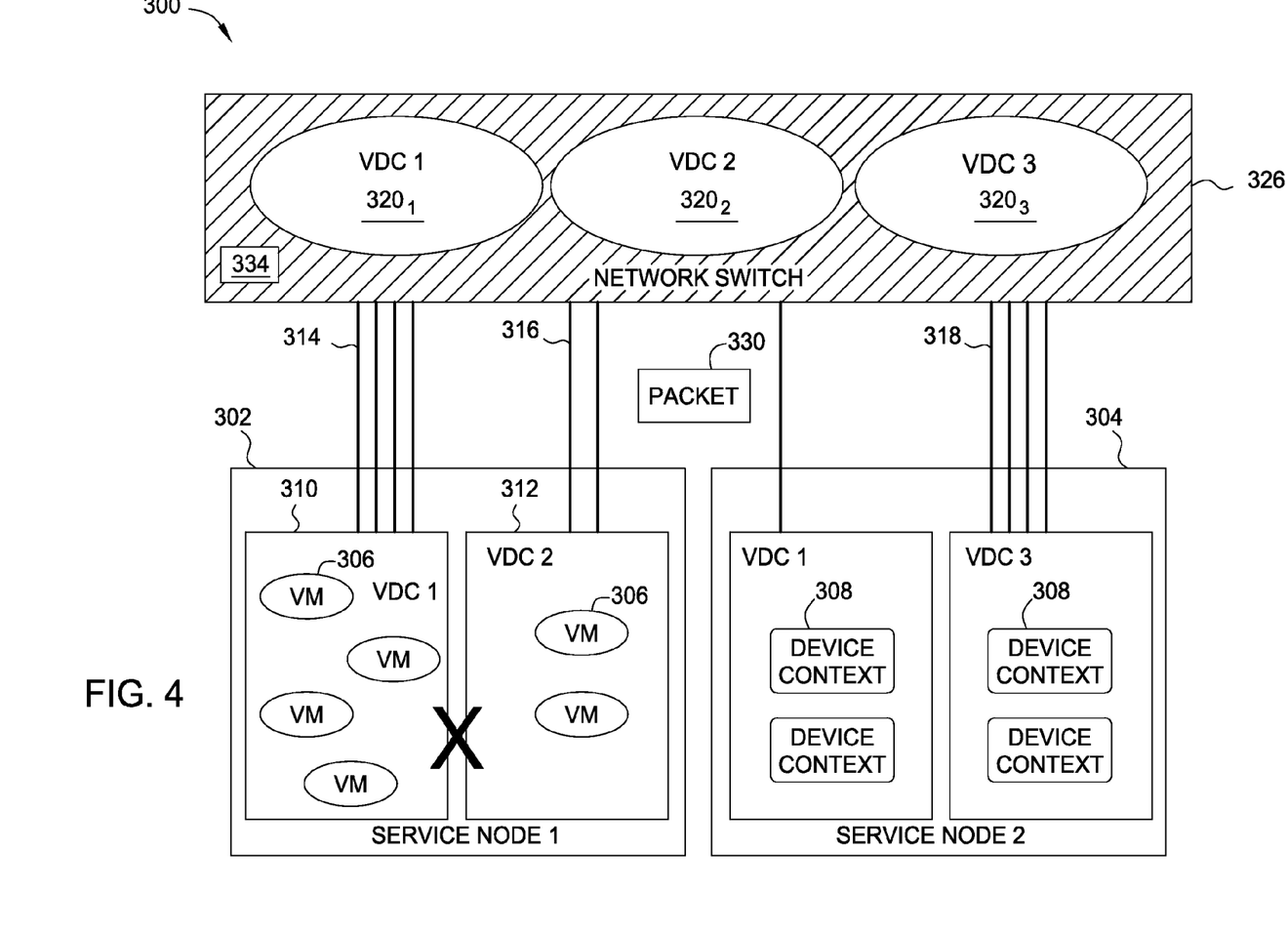
FIG. 4 illustrates the network of FIG. 1, where service nodes do not allow cross-VDC traffic, according to an example embodiment of the present disclosure.

FIG. 4 illustrates a mode in which network 300 of FIG. 3 prevents cross-VDC traffic flow. In this mode, a virtual switch forwards network traffic to the service node and service node will return the network traffic only to that virtual switch. For some embodiments, the service nodes 302, 304 may exchange frames 330 with network switch 326. In this example operating mode, the service nodes 302, 304 are generally unaware that the service node is exchanging data with multiple VDCs of the same network switch. Instead, in this mode, the service nodes 302, 304 act as if they are connected to multiple separate physical network switches. From the view of the service nodes 302, 304 the VDCs are the same VLAN and operating in the same broadcast domain. In this mode, cross-VDC traffic flow is prevented between the VDCs. For example, in a network configured to prevent cross-VDC traffic, a firewall connected to a network switch having two VDCs will firewall between the VDCs.

Figure 5:
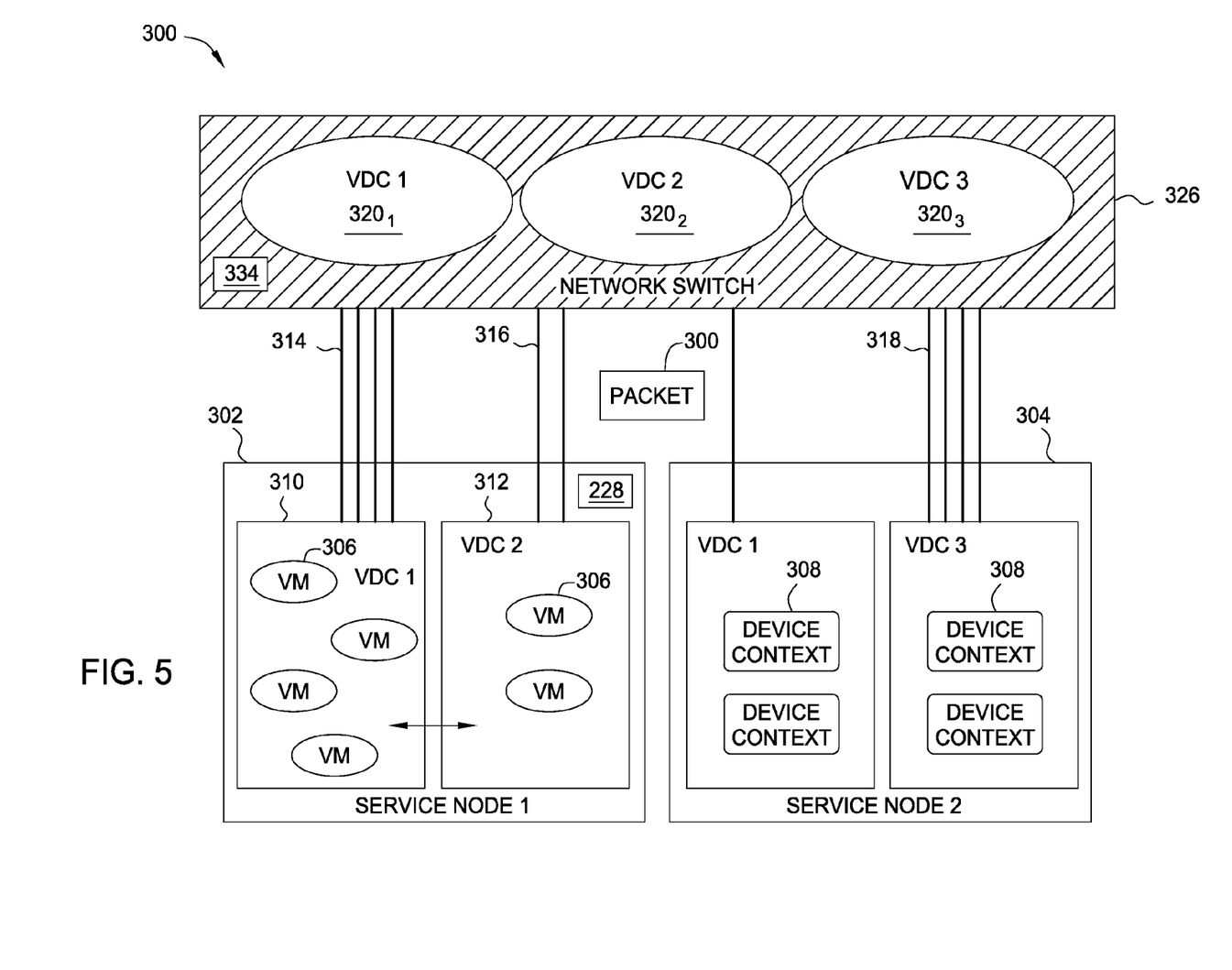
FIG. 5 illustrates the network of FIG. 1, where service nodes permit cross-VDC traffic, according to an example embodiment of the present disclosure.

FIG. 5 illustrates another example operating mode in which network 300 allows cross-VDC traffic flow, according to embodiments of the present disclosure. In this embodiment, the service nodes 302, 304 may identify the VDC of data traffic using the port-VDC index. The service nodes 302, 304, in this mode, are generally aware that data is being received from multiple VDC of the same physical switch as opposed to multiple physical switches. The service nodes 302, 304 treat each VDC as a separate VLAN with a unique broadcast domain. In this mode, cross-VDC traffic flow is allowed between the virtual partitions.

In this mode, a physical port may be virtualized to enable full utilization of VDCs on a network switch by a service node having fewer physical ports than the number of VDCs on the network switch. A single link 314, 316, 318 may connect a service node 302, 304 and a network switch 300 having multiple VDCs 320. Permitting cross-VDC traffic allows a VDC to send traffic to a different VDC. Traffic received by the service node from a first virtual switch in VDC 1 via link 314 may be sent to a second virtual switch in VDC 2 via the same link 314. Therefore, the port is virtualized into multiple virtual ports and the service node may support multiple VDCs from a single port.

Figure 6:
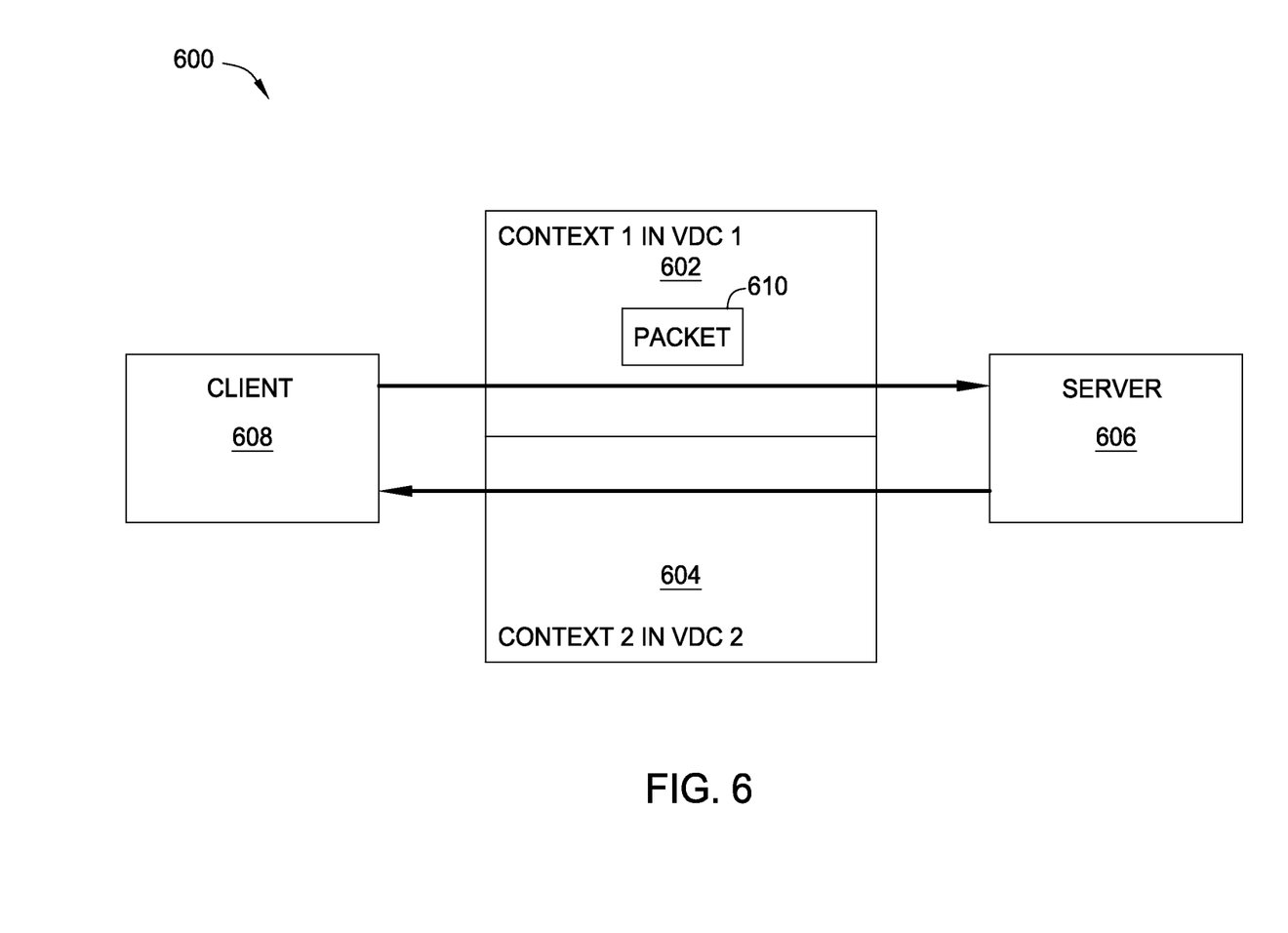
FIG. 6 illustrates the network of FIG. 5, where a firewall is segregated into multiple device contexts mapped to multiple VDCs of a network switch and is configured to prohibit cross VDC-traffic from a client and a server, according to an example embodiment of the present disclosure.

FIG. 6 shows a network 600 having a first device context 602 in a first VDC and a second device context 604 in a second VDC. In the example of FIG. 5, assume that context 1 602 is a partition (e.g., virtual machine or device context) of a service node and that context 2 604 is another partition of the service node. Assume that context 1 602 is mapped to VDC 1 of a network switch and that context 2 604 is mapped to VDC2 of the same network switch. For some embodiments the service node may be a firewall context configured as at least two VMs or virtual firewalls. The network also includes a server 606 and a client 608. Assume that client 608 and server 606 are also connected to the network switch. The firewall context, client 608, and server 606 may all be coupled via links to a network switch. As used herein, a client may be any device connected to a network such as, but not limited to, a mobile device, laptop, tablet, or personal computer (PC). As used herein a server may be any device which answers requests from a client and serves other devices on a network, such as an server configured to provide webpages in response to a user's (client) request. The firewall may also be connected to multiple virtual switches on the network switch via a single physical port and, by extending the VDC for each virtual switch to include resources on the firewall, the firewall may be configured to handle traffic using different resources (e.g., different firewall processing rules depending on the VDC of a given frame) or return the traffic to specified VDC, based on an identification of which VDC forwarded the traffic to the firewall.

According to some embodiments, the firewall honors VDC information and does not allow traffic from one VDC to flow to another VDC. Because the VDC is configured to prevent traffic to change VDCs while being processed by the service node, a packet 610 sent from client 608 to server 606 may be sent to the first VDC only and will only be handled by context 1 502 in VDC 1. Similarly, a packet 610 sent from server 606 to client 608 may be sent to the second VDC only and will only be handled by context 2 504 in VDC 2.

Figure 7:
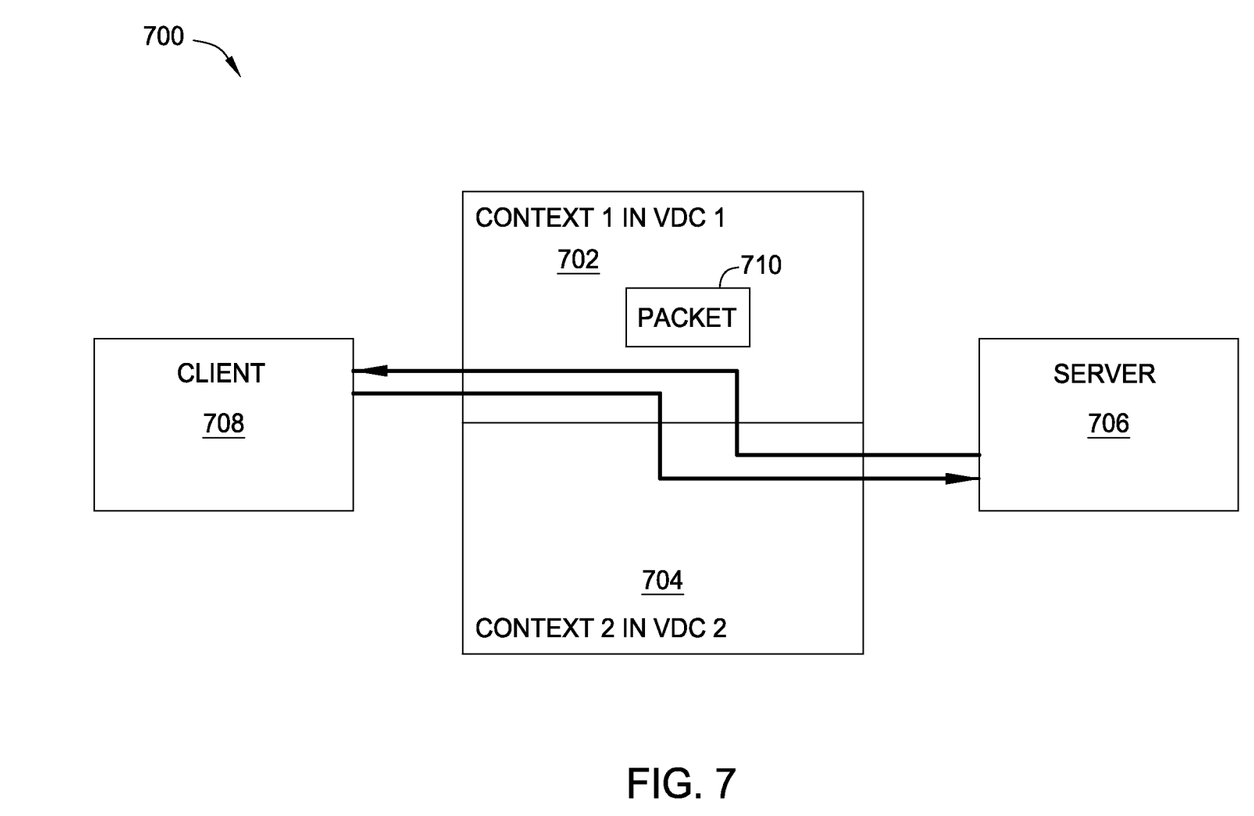
FIG. 7 illustrates the network of FIG. 6, where the firewall is configured to allow cross-VDC traffic from the client and the server, according to an example embodiment of the present disclosure.

As an example of the network configuration of FIG. 5 where cross-VDC traffic is allowed, FIG. 7 illustrates a network 700 configured such that the firewall ignores VDC information and treats it as though everything is in one VDC only, thereby allowing traffic from one VDC to flow to another VDC. In this example, a packet 610 sent from client 608 to server 606 may be sent from VDC 1 to VDC 2 within the firewall. Likewise, a packet 610 sent from server 606 to client 608 may be sent from the second VDC to the first VDC.

Figure 8:
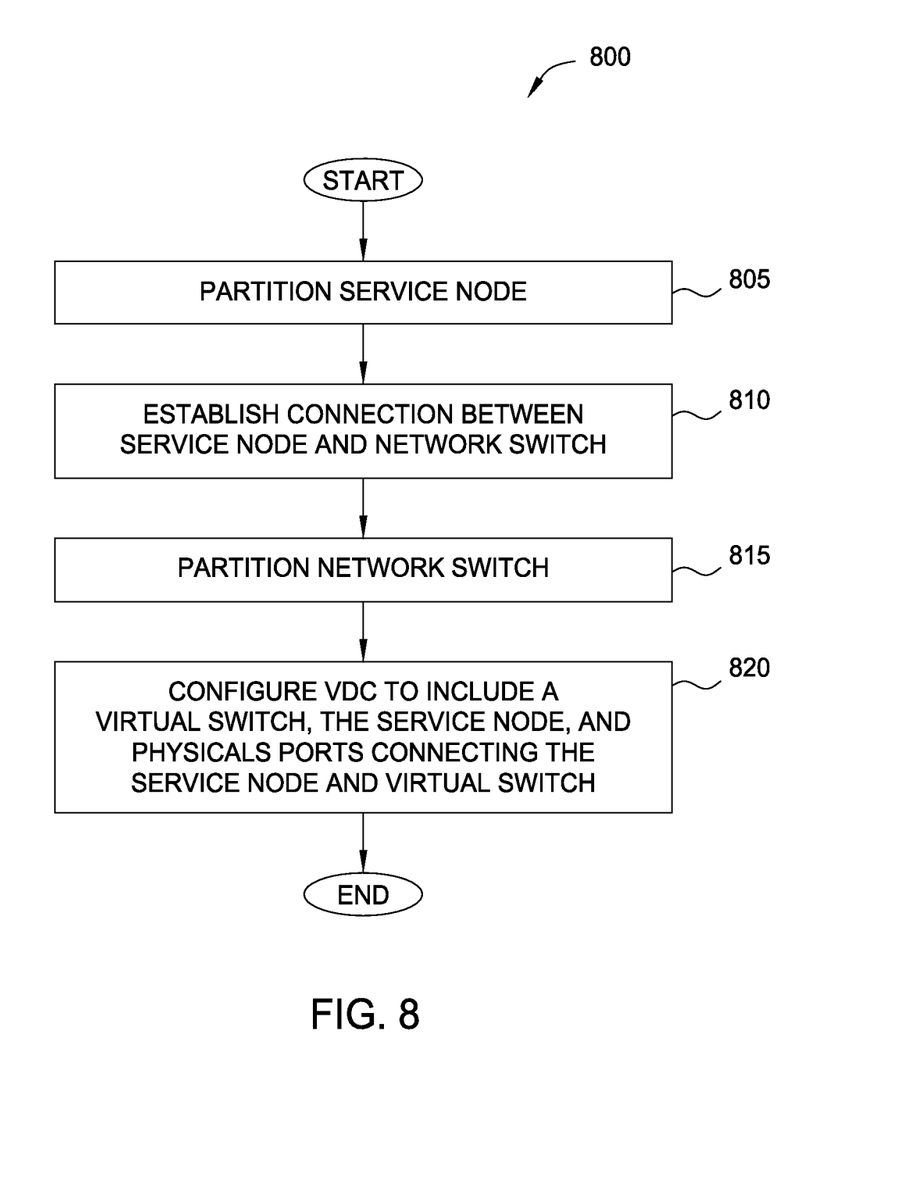
FIG. 8 illustrates a method of extending a VDC on a network switch to include a partition on a service node and a link.

FIG. 8 illustrates a method 800 for configuring a system for hosting services. As shown, in step 805, a service node is partitioned into VMs or device contexts which may be assigned to a VDC. For example, a VM on the service node providing a firewall service could be assigned to a VDC of a virtualized switch. At step 810, a connection is established between the service node and a network switch via a link between physical ports on the service node and physical ports on the network switch. Step 815 includes partitioning the network switch into one or more virtual switches. At step 820 includes associating a VDC with a configuration of a virtual switch and configuring the VDC to include a virtual switch, physical ports on the network switch assigned to the virtual switch, at least one VM on the service node, and a physical port on the service node.

Extending the VDC concept to service nodes provides a coupling between network switches and service nodes (service appliances and/or service line cards). These features provide ease of deployment, configuration, and management of networks and network devices, better data sharing between devices, and enhanced traffic processing.

As will be appreciated by one skilled in the art, embodiments may be embodied as a system, method, or computer program product. Accordingly, aspects may take the form of an entirely hardware embodiment, an entirely software embodiment (including firmware, resident software, microcode, etc.), or an embodiment combining software and hardware aspects that may all generally be referred to herein as a "circuit," "module," or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The figures illustrate the architecture, functionality and operation of possible implementations of systems, methods and computer program products according to various embodiments. In this regard, each block in the figures may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the figures (and combinations of blocks in the figures) can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope, thereof, and the scope thereof is determined by the claims that follow.

The invention claimed is:

1. A system for hosting network services, comprising:
a network switch configured to provide at least a first virtual switch having an associated first virtual device context (VDC), wherein the first virtual switch is assigned a first set of physical ports of the network switch and wherein the first virtual switch is defined by a first VDC configuration; and a service node that processes network traffic forwarded by the first virtual switch, wherein the service node includes at least a first port connecting the service node to one of the first set of physical ports associated with the first virtual switch, wherein the service node is configured to process the network traffic forwarded by the first virtual switch based on the first VDC associated with the first virtual switch and wherein the first VDC configuration provides a shared configuration for the first virtual switch and the service node for processing the network traffic forwarded to the service node by the first virtual switch.

2. The system of claim 1, further comprising:

a management application, wherein the management application specifies the first VDC configuration for the first virtual switch and the service node.

3. The system of claim 2, wherein the management application is configured to notify the service node when the VDC is created, deleted, suspended, or restarted.

4. The system of claim 1, wherein the service node hosts at least one of a firewall and a load-balancer.

5. The system of claim 1, wherein the service node hosts one or more virtual machines (VMs), and wherein at least one of the VMs is configured as part of the first VDC.

6. The system of claim 5, wherein the network switch stores an access control list (ACL), and wherein the service node further includes an ACL, and wherein the ACL of the service node is configured based on the first VDC associated with the first virtual switch.

7. The system of claim 5, wherein configuring the at least one of the VMs as part of the first VDC comprises mapping the at least one VM to the first VDC in the first VDC configuration shared by the first virtual switch and the service node.

8. The system of claim 1, wherein the service node hosts one or more device contexts and wherein at least one device context is configured as part of the first VDC, wherein the configuring comprises mapping the at least one device context to the first VDC in the first VDC configuration shared by the first virtual switch and the service node.

9. The system of claim 1, wherein the network switch further includes:

a second virtual switch having an associated second VDC, a second VDC configuration and a second set of physical ports assigned to the second virtual switch, wherein the first port on the service node connects the service node to one of the second set of physical ports of the network switch, wherein the service node is configured to process the network traffic forwarded by the second virtual switch based on the second VDC, and wherein the second VDC configuration provides a shared configuration for the second virtual switch and the service node for processing the network traffic forwarded to the service node by the second virtual switch.

10. The system of claim 9, wherein the service node is configured to identify incoming network traffic as forwarded by the first virtual switch or the second virtual switch of the network switch based on a port-VDC index.

11. The system of claim 10, wherein the service node is configured to process the network traffic based on the first VDC or the second VDC based on the identification of the network traffic as forwarded by the first virtual switch or the second virtual switch.

12. The system of claim 10, wherein the service node is configured to prevent network traffic to flow between the first VDC and the second VDC via traffic forwarded to the service node for processing.

13. The system of claim 10, wherein the service node is configured to allow network traffic to flow between the first VDC and the second VDC via traffic forwarded to the service node for processing.

14. The system of claim 13, wherein the first VDC is associated with a first device context and the second VDC is associated with a second device context, and wherein allowing network traffic to flow between the first VDC and the second VDC comprises switching between the first device context associated with the first VDC and the second device context associated with the second VDC via a shared interface between the first VDC and the second VDC.

15. A method of configuring a system for hosting network services, comprising:

providing a network switch having a first virtual switch, wherein the first virtual switch includes a first set of physical ports assigned to the first virtual switch;

providing a service node that processes network traffic forwarded from the first virtual switch, wherein the service node has a first port connecting the service node to one of the first set of physical ports assigned to the first virtual switch; and configuring a first virtual device context (VDC) on the network switch and the service node, wherein the service node is configured to process the network traffic forwarded by the first virtual switch based on the first VDC and wherein the first VDC provides a shared configuration for the first virtual switch and the service node for processing the network traffic forwarded to the service node by the first virtual switch.

16. The method of claim 15, further comprising:

providing a second virtual switch of the network switch, wherein the second virtual switch includes a second set of physical ports assigned to the second virtual switch; and configuring a second VDC on the network switch and the service node, wherein the first port on the service node connects the service node to one of the second set of physical ports of the network switch, and wherein the service node is configured to process the network traffic forwarded by the second virtual switch based on the second VDC.

17. The method of claim 16, wherein the service node identifies incoming network traffic as forwarded by the first virtual switch or the second virtual switch of the network switch based on a port-VDC index.

18. The method of claim 17, wherein the service node either allows or prevents network traffic to flow between the first VDC and the second VDC via traffic forwarded to the service node for processing.

19. The method of claim 16, wherein the service node is configured to process network traffic forwarded by the network switch based on the first VDC or the second VDC based on the identification of which virtual switch forwarded the network traffic.

20. A computer readable storage medium which, when executed on a computer system performs operations for configuring a system for hosting network services, comprising:

configuring a network switch having a first virtual switch, wherein the virtual switch includes a first set of physical ports assigned to the first virtual switch;

configuring a service node that processes network traffic forwarded from the first virtual switch, wherein the service node has a first port connecting the service node to one of the first set of physical ports; and configuring a first virtual device context (VDC) on the network switch and the service node, wherein the service node is configured to process the network traffic forwarded by the first virtual switch based on the first VDC and wherein the first VDC provides a shared configuration for the first virtual switch and the service node for processing the network traffic forwarded to the service node by the first virtual switch.

21. The computer readable storage medium of claim 20, wherein the operations further comprise:

creating, deleting, suspending, or restarting the VDC; and
notifying the service node when the VDC is created, deleted, suspended, or restarted.

22. The computer readable storage medium of claim 20, wherein the operations further comprise:

configuring the network switch, wherein the network switch has a second virtual switch, and wherein second virtual switch includes a second set of physical ports assigned to the second virtual switch; and configuring a second VDC on the network switch and the service node, wherein the first port on the service node connects the service node to one of the second set of physical ports of the network switch, and wherein the service node is configured to process the network traffic forwarded by the second virtual switch based on the second VDC.

23. The computer readable medium of claim 22, wherein the service node is configured to identify which virtual switch forwarded the network traffic based on a port-VDC index.

24. The computer readable medium of claim 23, wherein the service node is configured to either allow or permit the network traffic to flow between the first VDC and the second VDC via traffic forwarded to the service node for processing.

25. The computer readable medium of claim 23, wherein the service node is configured to process network traffic forwarded by the network switch based on the first VDC or the second VDC based on the identification of which virtual switch forwarded the network traffic.

* * * * *